United States Patent [19]

Glaser et al.

[11] Patent Number: 5,449,459
[45] Date of Patent: Sep. 12, 1995

[54] DOME SHAPED EXTRUSION FILTER SUPPORT

[75] Inventors: Robert J. Glaser; Stephen D. Glaser; Hung V. Vo, all of Houston, Tex.

[73] Assignee: Dymat, Inc., Houston, Tex.

[21] Appl. No.: 61,160

[22] Filed: May 13, 1993

[51] Int. Cl.⁶ ............................................. B01D 29/07
[52] U.S. Cl. ...................... 210/498; 210/483; 210/499; 210/489; 425/197; 425/199; 425/376.1
[58] Field of Search ............... 210/767, 483, 489, 499, 210/488, 498, 490; 425/199, 386.1, 376.1, 197

[56] References Cited

U.S. PATENT DOCUMENTS

| | | | |
|---|---|---|---|
| 791,111 | 5/1905 | DuPont | 425/179 |
| 3,811,659 | 5/1974 | Taylor et al. | 210/498 |
| 4,057,379 | 11/1977 | Sato | 425/199 |
| 4,543,114 | 9/1985 | Beattie et al. | 210/498 |
| 4,918,017 | 4/1990 | Greenstreet et al. | 425/197 |
| 5,243,632 | 9/1993 | Badin et al. | 210/767 |

FOREIGN PATENT DOCUMENTS 3742964 11/1989 Germany .

Primary Examiner—Robert A. Dawson
Assistant Examiner—Ana M. Fortuna
Attorney, Agent, or Firm—E. Richard Zamecki

[57] ABSTRACT

Disclosed is a filter support for use as part of a screened packing, or filter system, in an extrusion process, wherein the filter support provides a rigid wall in the shape of a dome featuring flow passage holes through the wall such that the longitudinal axis of each hole is perpendicular to a plane tangent to the surface of the dome at the location of the hole.

12 Claims, 3 Drawing Sheets

DOME SHAPED EXTRUSION FILTER SUPPORT

BACKGROUND OF THE INVENTION

1. Field of the Invention

The present invention pertains to filter systems. More particularly, the present invention relates to screen packs of the type used in extrusion processes, for example.

2. Description of Prior Art

In an extrusion process, material is forced through a forming die, after which it is cooled or chemically hardened. Different types of machines are used to drive the material to be extruded, such as one or more rotating screws of variable pitch. The driving mechanism may be capable of applying considerable pressure to force the extrusion material through the die.

In particular, in the extrusion of polyolefins and other types of polymers, for example, the extrusion material is heated as it is being compressed by the driving mechanism, and different additives are introduced into the material as well. The final product is then forced through one or another type of die or other mechanical device to form various finished products, such as strands, pellets or film. After all of the additives are introduced into the extrusion material, and the material is heated and compressed, some of the additive material may remain in its original, unreduced state in which it was introduced into the extrusion system. Also, some of the contents of the system may have solidified during the compression and heating of the material. Finally, some impurities may be in the system, and must be removed before the finished product is formed. Consequently, a filter system is incorporated in the extrusion system, generally in a tubular section just prior to the extruding material entering the final section of the extrusion line where the extrusion die is located. The filter system screens out the unwanted impurities and unprocessed additives, and catches any plastic particles that may have solidified, ensuring that only the fluid portion of the polymer is presented to the extruder die. In most extruding machines the polymer extrusion material passes through a circular, cylindrical portal when leaving the screw section to pass through the filtration system and on to the die section. Consequently, most filtration systems are flat, disc shaped, wherein the polymer must pass through a circular, flat filter oriented perpendicularly to the longitudinal axis of the extrusion line and, therefore, to the general direction of the material flow. The flat filter system includes a mesh held in place by a back, or support. The filter support is a flat metal plate with holes passing through it; the mesh, or filter screen may include multiple layers of screening material with holes smaller than the holes through the support, and wherein the size of the screen holes determine the smallest size particles which may pass through the filter system. The support is provided to anchor and strengthen the filter screen, and prevent it from being deformed or otherwise damaged by the polymer flow.

The total cross-sectional area available for polymer flow through a flat filter system is limited by how large the holes through the filter support may be while still providing sufficient support for the filter screen, and how close together the filter support holes may be while still allowing sufficient strength for the filter support to counter the force of the polymer flow. While a stronger filter support may be provided using a thicker-walled support, the thicker wall of the filter support makes the length of the flow passages through the filter support longer, thereby providing greater resistance to the polymer flow through the filter support passages. The cross-sectional area available for polymer flow through the filter system may be increased by deviating the filter system shape from a flat disc. One variation to provide greater cross-sectional flow area to the polymer flow is provided by a cone filter support in conjunction with a cone screen filter, with the vertex of the cone-shaped filter system pointing downstream in the polymer flow. Another variation utilized to obtain greater cross-sectional flow area for the polymer includes a flat base to which are attached a plurality of tubes positioned mutually parallel and oriented longitudinally relative to the tubular structure within which the filter system is positioned, that is, longitudinally relative to the flow of the polymer material along the extrusion line. Each of the filter support tubes has numerous holes therethrough, perpendicular to the longitudinal axis of the filter system, and a filter screen is positioned on each of the support tubes; a filter screen is positioned inside each support tube if the tubes are directed downstream; a filter screen is positioned on the outside of each support tube if the support tubes are oriented upstream.

Although the cone and the tube filter system variations may provide greater cross-sectional flow area, each of these variations requires that the polymer flow change direction to pass through the filter system. In the case of the filter system with tubes, the polymer flow generally undergoes two right angle turns to get through the filter system. Such abrupt turning may alter the relationship between long chain polymers. Further, in the case of the filter system tubes directed downstream, the polymer flow is further broken up by being directed along separate paths into the array of tubes, then being split up in each tube for passage through the holes in the tube wall, after which the flow passing out of adjacent tubes comes together and must change direction again. This process is generally reversed where the tubes are directed upstream. In either case, the polymer flow may be expected to be turbulent, subjecting the polymer material to possible breakdown. Also, while the tube filter system structure may allow the use of thinner walls in the tubular support members, compared to the thickness of a flat filter support with comparable cross-sectional flow area for the polymer material, the closeness of the filter tubes combined with the circuitous paths the polymer material must follow provides a greater back pressure in the polymer material. In the case of the cone filter system, the flow of the extrusion material is directed outwardly against the outer wall of the tubular member housing the filter system.

Another filter system variation has been proposed for providing strength to the filter support while allowing the wall of the filter support to be thinner than in the case of a flat support. The proposed shape is a portion of a sphere with the convex surface facing upstream, and with the filter screen lying against the convex surface. A particular arrangement of holes through the wall of the support has also been proposed, consisting of holes all of which are longitudinally oriented parallel to the longitudinal axis of the filter system and the tubular housing containing the filter system. Further, the holes are arranged in circles centered on the longitudinal axis of the support, with each circle of holes positioned to intersect the concave surface of the support at equal increments of displacement along the longitudinal axis of the support. It will be appreciated that the distance along the support surface between adjacent rows decreases for rows positioned away from the vertex of the partial sphere. In general, the density of holes through the partial spherical surface increases for increased transverse distance away from the principle axis of the partial sphere. If all of the holes through the partial sphere support are of the same cross-sectional area, and if all of the holes in one circle are as mutually displaced along the surface as all of the holes in any other circle, then the cross-sectional area available for polymer flow through the filter system also increases for increased transverse distance away from the center of the tubular housing containing the filter system. Thus, the flow along the walls of the extruder apparatus at the filter system would tend to be faster than the flow along the center. Consequently, the extruder material may tend to move radially outwardly as the material approaches the filter system. Further, the length of the passage through the holes in the support increases with radial displacement of the holes from the central axis of the filter support, thus causing greater resistance to flow through the holes of longer passage and an increase in back pressure in the polymer material.

It would be desirable and advantageous to provide a filter system, or screen packing, whose support structure, or filter backing, can not only withstand the forces of the polymer flow being driven by the extruder apparatus, but minimizes potential damage to the polymers, minimizes back pressure in the extrusion material, minimizes resistance to the flow of the polymer material through the filter support and promotes laminar flow of the polymer material. The present invention provides a filter support which meets these objectives, and improves on the aforementioned proposed partial sphere with the aforementioned proposed arrangement of holes through the filter support.

SUMMARY OF THE INVENTION

The present invention provides a filter support for use as part of a screen packing, or filter system, including a screen filter, for use in a system for extruding polyolefins and the like. The filter support provides a rigid wall that includes the shape of a dome, the convex surface of the dome facing upstream when the filter support is located within the tubular enclosure provided in the extrusion line for the filter system. The dome portion of the rigid wall is broken by an array of holes forming flow passages for material being extruded to pass through the wall. The holes are oriented relative to the wall so that the longitudinal axis of each hole is perpendicularly to the surface of the dome at the location of the hole.

The array of holes comprises a plurality of generally circular rows of holes, with each row centered on the central axis of the dome. The holes in a row are generally uniformly spaced about the circumference of that row, and the rows are generally uniformly spaced relative to each other. Further, the number of holes in each row is a maximum for a selected minimum distance between the centers of adjacent holes on each row, and the number of rows between the smallest row and the largest row is a maximum for a selected minimum distance between a line running through the centers of the holes of one row and a line running through the centers of the holes of the next adjacent row.

The dome shape may comprise a portion of a sphere. The radius of the dome shape at its base may be greater than the height of the dome shape. Further, the radius of the dome shape at its base may be less than the height of the dome shape.

In a method of the invention, a filter system is provided in an extrusion line, including a filter support and a filter screen positioned adjacent the filter support, the filter support including a dome shape having a central axis and a convex surface facing upstream. Flow passage holes are provided through the dome shape of the filter support wherein the longitudinal axis of each hole is perpendicular to the plane tangent to the surface of the dome at the location of the hole. Extrusion material is caused to flow through the filter system such that the direction of flow on the downstream side of the dome shape is generally toward the central axis of the dome shape.

DESCRIPTION OF PREFERRED EMBODIMENTS

Figure 1:
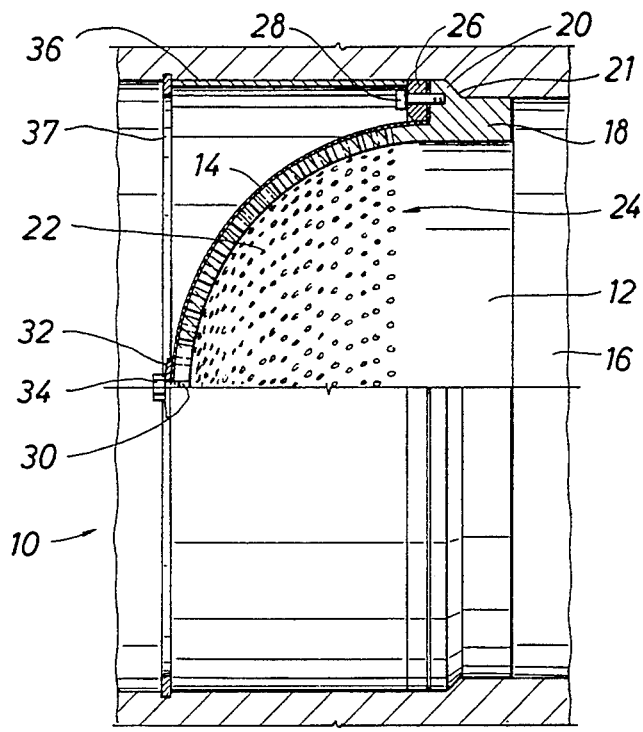
FIG. 1 is a side elevation in partial section of a filter system having a dome shaped filter support according to the present invention, shown positioned in a tubular housing of an extrusion system.

A filter system for use in an extrusion process is shown generally at 10 in FIG. 1. The filter system 10 includes a filter support 12 and a mesh, or screen assembly, 14 adjacent and attached to the filter support 12. The filter system, or screen packing, 10 is positioned in the extrusion line within a tubular structure 15. As viewed in FIG. 1, the general direction of flow of the extrusion material is from left to right, and the screen material 14 is positioned on the upstream side of the filter support 12.

The filter support 12 includes, at its downstream end, a generally cylindrical tubular pedestal, or foundation, 18, having an external, annular shoulder 20 which engages an interior annular shoulder 21 of the tubular structure 16. The remainder of the filter support 12 is in the form of a round, dome shape 22. In this regard, the term "dome" refers to a generally rounded, three-dimensional shape, having a convex surface and a concave surface, and is not limited to a hemisphere or any portion of a sphere.

The dome portion 22 of the filter support 12 is broken by an array of holes, or flow passages, shown generally at 24 in FIG. 1. The array of holes 24, discussed more fully below, provides flow passages through the filter support 12 for the extrusion material moving generally from left to right in FIG. 1. The mesh, or screen assembly, 14 covers the entire region of the dome 22 that is broken by the holes 24 so that extrusion material must pass through the mesh before proceeding through the holes in the filter support 12. The filter support 12 provides a rigid wall to anchor and maintain the mesh 14 in place, including maintaining the shape of the mesh in the general shape of the dome provided by the filter support. With the size of the holes in the mesh 14 being smaller than the size of the holes 24 through the dome 22, the mesh hole size determines the filter hole size through which the extrusion material must pass.

The mesh 14 overlies the convex, upstream surface of the dome portion 22, and lies as well against the upstream surface of the annular shoulder 20. A ring 26 clamps the mesh 14 against the shoulder 20, and is held thereto by a plurality of bolts 28 (only one shown) passing through appropriate holes in the ring and being received in threaded holes in the shoulder.

As an option for further holding the mesh 14 against the filter support 12, the center, or apex, of the dome shape 22 may feature a threaded bore 30. A generally circular plate 32, for example, featuring a central hole, is held against the top surface of the mesh 14. A bolt 34 passes through the hole in the plate 30 and is threadedly engaged in the hole 30 of the filter support dome 22, thus maintaining the central portion of the mesh 14 also anchored against the filter support 12.

A cylindrical collar 36 is positioned on the upstream side of the filter support shoulder 20 and engages the ring 26. A snap ring 37 resides in an appropriate groove in the interior surface of the tubular structure 16. The snap ring 37 prevents the collar 36 from moving away from the ring 26. The filter system 10 is thus anchored in place in the tubular structure 16 by the combination of the shoulder 21 and the snap ring 37.

As the extrusion material is forced to the filter system 10, the material passes through the mesh 14 and the holes 24 in the filter support 12, whereupon solid particles of various materials, such as solidified extrusion material or additive material that has not been sufficiently mixed with the extrusion material, or impurities, for example, are caught by the screen assembly 14. The filtered extrusion material that passes through the support 12 moves on to the final stage or stages of the extrusion process. It will be appreciated that the filter system 10 may have to be cleaned occasionally. Depending on the materials caught by the filter system 10, for example, the cleaning may only involve soaking the filter system in appropriate solvents and/or washing the filter system with a high pressure stream of water, for example. If necessary, the bolts 28 and 34 may be removed, and the mesh 14 taken off of the filter support 12 for more detailed cleaning. The filter support may then, of course, be refitted with the cleaned mesh 14, or a new, unused mesh.

Figure 2:
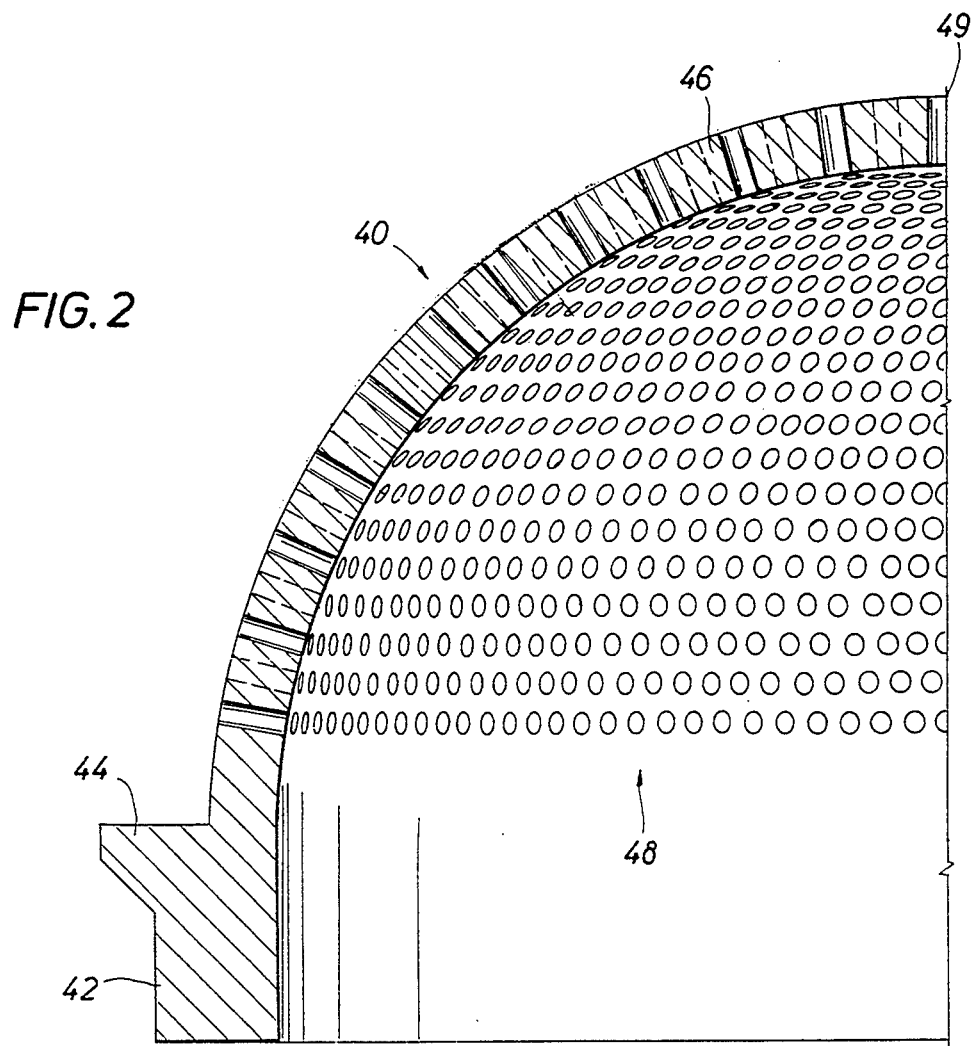
FIG. 2 is a quarter-sectional, partly schematic, view of a filter support according to the present invention, whose dome shape comprises a portion of a sphere.

A quarter section of a filter support according to the present invention is shown generally at 40 in FIG. 2, and features a generally cylindrical tubular pedestal, or foundation, 42 with an external, annular shoulder 44. Again, the shoulder 44 may be utilized in anchoring the mesh assembly (not shown) onto the filter support 40 as well as to position and maintain the filter system of which the filter support is a part within an appropriate housing, or tubular structure, in an extrusion process line. The filter support 40 features a dome shape 46 that is a portion of a sphere, and, in particular, essentially a hemisphere. The hemisphere 46 is broken by an array of holes, or passages, indicated generally at 48. The longitudinal, or central axis of the hemisphere 46 is also the longitudinal, or central, axis of the filter support 40, and passes through the apex 49 of the hemisphere. The array of holes 48 comprises a plurality of rows of holes, which rows are generally circular and are concentric with the longitudinal axis of the hemisphere 40. Further, each hole in the array 48 comprises a circular, cylindrical passage through the wall of the dome 46 that is perpendicular to the concave surface of the hemisphere as well as to the convex surface of the hemisphere at the location of the hole. Each hole in the array 48 has a central, longitudinal axis, and that axis is perpendicular to a plane that is tangent to the concave surface of the hemisphere 46 at the location of the hole in question. Likewise, the longitudinal axis of each hole is perpendicular to a plane that is tangent to the convex surface of the dome 46 at the location of the hole in question.

The central, longitudinal axis of each hole of the array 48 lies along a radius of the hemisphere 46. The longitudinal axes of all of the holes of the array 48 thus intersect at the center of the hemisphere 46, which also lies on the central axis of the filter support 40. As the extrusion material passes through the holes of the array 48, from the convex side of the dome to the concave side of the dome, the flow of the extrusion material through the passages is generally toward the central axis of the filter support 40.

The array of holes 48 is constructed to provide the greatest amount of cross-sectional flow passage area through the dome 46 while, at the same time, ensuring that the amount of remaining wall area of the filter support 40 provides the strength necessary to withstand the pressures applied by the extrusion material being forced down the extrusion line against the filter support. The flow passage area through the dome 46 is increased by increasing the size and/or density of the holes in the array 48. The filter support wall area is increased by decreasing the size and/or density of the holes in the array 48. The transverse cross-sectional area of the holes, which is the same for all holes, is selected to be large enough to minimize resistance to flow therethrough by the extrusion material, and small enough to prevent the mesh from being broken or grossly distorted by the extrusion material. Once the hole size is selected, a minimum distance between adjacent holes measured between the centers of the holes, for example, may be specified to ensure the necessary wall surface area. In each row, the maximum number of holes is provided, allowing for the selected minimum distance between the centers of adjacent holes in that row. Also in each row, the holes are uniformly spaced about the circular row. In some rows, the spacing between holes may be greater than the specified minimum distance. The representation of holes 48 shown in the cross section of the dome 46 is partly schematic; there may not be arcs on the dome, in planes including the central axis of the dome, that cut through holes in every row. The spacing between adjacent rows may be determined, for example, in terms of the spacing along either the convex surface or the concave surface of the dome 46, between a line on such surface drawn through the centers of the holes in one row and a line drawn on the same surface through the centers of the holes in the next adjacent row. The spacing between adjacent rows of holes is the same for all pairs of adjacent rows. Again, the distance between adjacent rows may be selected to be at least as large as some specified minimum distance the same as, or at least consistent with, the specified minimum distance between adjacent holes.

Figure 3:
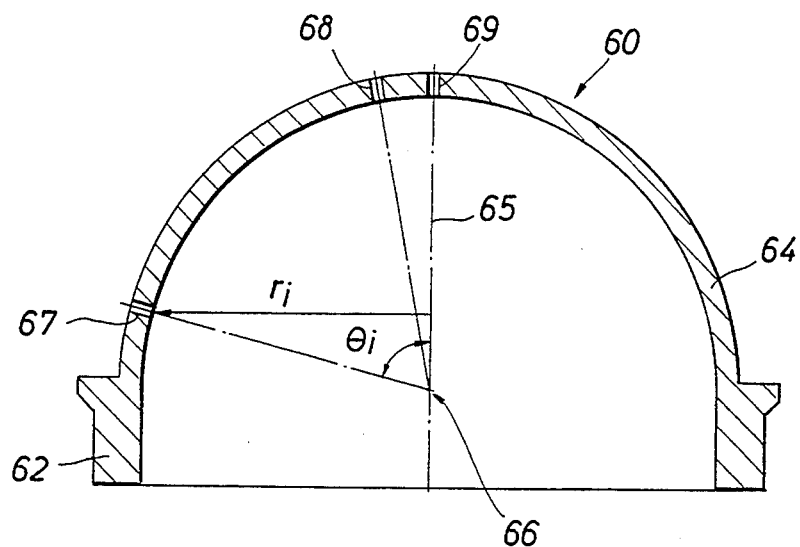
FIG. 3 is a schematic side elevation in cross section of a filter support according to the present invention, whose dome shape comprises a portion of a sphere, showing radii and projections indicating the positioning of rows of holes in the filter support.

FIG. 3 illustrates a filter support shown generally at 60, including a generally cylindrical tubular pedestal 62 and a dome 64 in the shape of a portion of a sphere, again essentially a hemisphere. The center of the hemisphere 64 is indicated at 66 lying along the longitudinal, or central, axis 65 of both the dome shape and the filter support 60 in general. A hole 67 is shown on the ith row of holes. Since the hole 67 is oriented so that its longitudinal axis is perpendicular to either surface of the dome 64 at the location of the hole, the longitudinal axis of that hole lies on a radius of the partial sphere and extends to its center 66. A hole 68 is shown at another location, in yet another row, on the dome 64; the longitudinal axis of the hole 68 is also shown to be on a radius of the hemisphere 64. An angle $\theta_i$ is thus defined between the central axis 65 and the longitudinal axis of the hole 67 on row i where i varies from one to n, the number of rows, with row one being the smallest row and row n being the largest row. The first row may be a single hole 69 at the apex of the dome. The value of the angle $\theta_i$ also determines the position of the ith row of holes. The perpendicular distance between the dome central axis 65 and the location of the hole 67, particularly specified in this regard by the intersection of the central, longitudinal axis of the hole with the concave surface of the dome 54, is $r_i$. The distance $r_i$ also provides the radius, measured to the concave surface of the dome 64, of the ith circle of holes. In this way, values of the angle $\theta_i$ may be used to determine the position of each row of holes through the partial sphere 64. Alternatively, values of the radius $r_i$ may be used to locate each circle of holes on the partial sphere 54. Either or both of the quantities $\theta_i$ and $r_i$ may be utilized in providing the array of holes through the dome 54.

The incremental difference in $\theta_i$ between adjacent rows of holes is directly related to the spacing between adjacent rows, as well as the size of the dome. To achieve the uniform spacing between rows of holes for a partial spherical dome, as shown in FIGS. 2 and 3, the angle $\theta_i$ need only be varied by equal increments between adjacent rows of holes. The TABLE is provided for a filter support having a hemispherical dome such that the radius of the concave surface of the hemisphere is 5.125±0.005 inches, and the radius of the convex surface of the hemisphere is 5.500±0.005 inches. The minimum spacing between the longitudinal axes of adjacent holes in a row where the axes intersect the concave surface of the dome is 0.29 inch, while the spacing between lines running through centers of holes in adjacent rows is 0.291 inch measured along the concave surface of the dome. The holes have diameters of 3/16 inch. The first column in the TABLE gives the number of the row, starting from the smallest row and continuing for twenty-six rows. The second column in the Table provides the corresponding values for the angle $\theta_i$ as defined above, given in degrees and minutes. The third column of the TABLE provides values for the quantity $r_i$ as defined above, given in inches. The fourth column gives the number of holes in the corresponding row.

The values of $\theta_i$ start at $\theta_1 = 0°\ 00'$ for the hole through the dome apex. The array of holes extends to just beyond the cylindrical pedestal of the filter support, to $\theta_{26} = 83°\ 20'$, that is, to include twenty-six rows. As many holes as possible are put in each row, limited by the above minimum spacing requirements between holes.

While the value of $\theta_i$ varies by equal increments between rows for the entire array of holes, the value of $r_i$ varies by ever decreasing amounts for greater values of $\theta_i$. Also, the number of holes per row does not increase by equal amounts as $\theta_i$ increases due to the distance-between-holes minimum restriction. Under the parameters set forth above, the total number of holes that may be provided in the array resulting from implementing the measurements of the TABLE is 1,688. In general, a greater number of rows and holes may be provided in the same size hemisphere by reducing the spacing between rows and/or reducing the spacing between holes within a row. Alternatively, fewer holes would be provided by increasing either or both of these distances. If the surface area of the hemisphere is larger, a greater number of holes can be provided through the dome for predetermined distances between rows and between adjacent holes.

TABLE

| Hole and row positioning in a partial sphere dome | | | |
|---|---|---|---|
| ROW | $\theta_i$ | $r_i$ (inches) | Holes in Row |
| 1 | 0° 00' | 0.046 | 1 |
| 2 | 3° 20' | 0.291 | 6 |
| 3 | 6° 40' | 0.580 | 12 |
| 4 | 10° 00' | 0.868 | 18 |
| 5 | 13° 20' | 1.153 | 25 |
| 6 | 16° 40' | 1.434 | 31 |
| 7 | 20° 00' | 1.710 | 37 |
| 8 | 23° 20' | 1.980 | 42 |
| 9 | 26° 40' | 2.244 | 48 |
| 10 | 30° 00' | 2.500 | 54 |
| 11 | 33° 20' | 2.748 | 59 |
| 12 | 36° 40' | 2.986 | 64 |
| 13 | 40° 00' | 3.214 | 69 |
| 14 | 43° 20' | 3.431 | 74 |
| 15 | 46° 40' | 3.637 | 78 |
| 16 | 50° 00' | 3.830 | 83 |
| 17 | 53° 20' | 4.011 | 87 |
| 18 | 56° 40' | 4.177 | 90 |
| 19 | 60° 00' | 4.330 | 93 |
| 20 | 63° 20' | 4.468 | 96 |
| 21 | 66° 40' | 4.591 | 99 |
| 22 | 70° 00' | 4.698 | 101 |
| 23 | 73° 20' | 4.790 | 103 |
| 24 | 76° 40' | 4.865 | 105 |
| 25 | 80° 00' | 4.924 | 106 |
| 26 | 83° 20' | 4.966 | 107 |
| TOTAL NUMBER OF HOLES = 1,688 | | | |

The dome shape of the rigid wall provided by a filter support according to the present invention takes advantage of the structural strength of an arch, or vault. However, the dimensions of the tubular structure provided in an extrusion line for receiving a filter system in a given case may not be such as to allow the receipt of a hemispherical dome. Nevertheless, a rounded dome may be provided, whether the dome is hemispherical, some portion of a sphere less than a hemisphere, or some other rounded shape. In general, the maximum height for a dome permitted by a filter system enclosure should be utilized to achieve maximum filter passage area combined with adequate filter support strength.

The base of the dome shape in any case may be defined by a plane perpendicular to the central axis of the dome and passing through the dome wall where the curvature of the dome begins, in the vicinity of the upstream end of the filter support pedestal such as 62 in FIG. 3. In the case of the hemisphere 64, the center of the hemisphere 66 lies in that plane at the point of intersection of the central axis 65 with the plane. The radius of the base, taken to either the concave surface of the dome or the convex surface of the dome, is the displacement of the selected surface from the central axis in the plane of the base. The height of the dome is the distance between the point of intersection of the dome base with the central axis of the dome and the apex of the dome, again taken at either the convex surface of the dome or the concave surface of the dome. The maximum height of the dome may be compared with the radius of the base of the dome to classify the dome. In the case of the hemisphere, the radius of the base of the dome is equal to the height of the dome. The dome in FIG. 1 has a height which is smaller than the radius of the base of the dome. Where a longer filter system enclosure is provided in an extrusion line, the height of the dome permitted may be greater than the radius of the dome base. Any rounded dome shape may be provided for the filter support to maximize the surface area of the dome while providing sufficient strength against the forces of the flowing extrusion material. Regardless of the shape of the dome in a specific embodiment of the present invention, the uniform density of flow passage holes through the dome may be provided, and each hole may be perpendicular to the dome as discussed above.

While the separation of holes and the separation of rows may be measured on either the concave surface of a dome or its convex surface, the measurements may be better determined along the concave surface, where the holes intersect the dome surface closer together. Concave surface distance determinations may be particularly preferred in the case of a dome that is not a portion of a sphere, and the radius of curvature of the dome varies.

Figure 4:
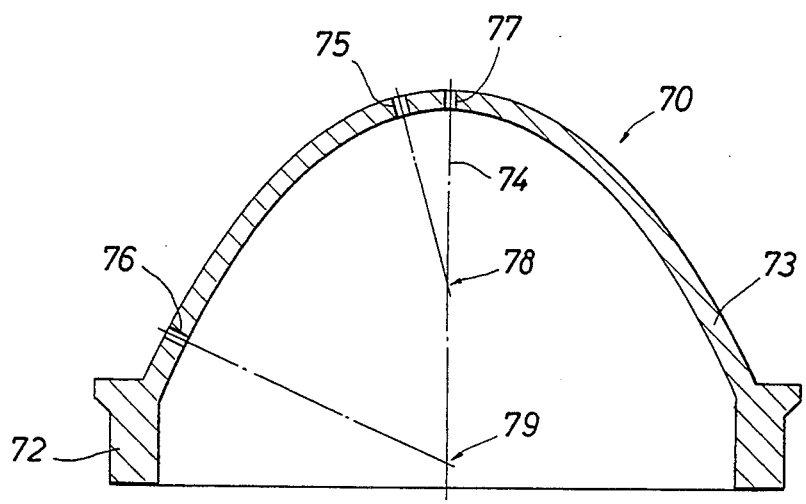
FIG. 4 is a schematic side elevation in cross section of a filter support according to the present invention, whose dome shape comprises a portion of a paraboloid.

FIG. 4 illustrates a particular case of a filter support, indicated generally at 70, having a generally cylindrical tubular pedestal 72 and a dome shape in the form of a paraboloid 73. The central axis 74 of the filter support 70 is also the axis of the paraboloid 73. The radius of the base of the dome 73, as defined above, is greater than the height of the paraboloid measured along its central axis 74. Two flow passage holes 75 and 76 are indicated in a row of holes close to the central axis 74, and a row of holes far from the central axis, respectively, with a hole 77 along the central axis. Each of the holes 75, 76 and 77 are provided perpendicular to the surface of the paraboloid 73 at the location of the respective hole. The longitudinal axis of the apex hole 79 is the longitudinal axis of the dome 73. The longitudinal axis of the hole 75 close to the central axis 74 intersects that axis at a point indicated at 78; the longitudinal axis of the hole 76 intersects the central axis 75 at a point indicated at 79. The longitudinal axes of the holes in a single, circular row will intersect the central axis 74 at the same point. However, the longitudinal axes of holes in different rows will intersect the central axis 74 at different points. Nevertheless, the rows of holes may be spaced along the paraboloid such that the distance between lines running through the centers of holes in any two adjacent rows, measured along the concave surface of the dome 73, is the same as the distance between the lines running through the centers of holes in any other pair of adjacent rows of holes, also taken along the dome concave surface.

Figure 5:
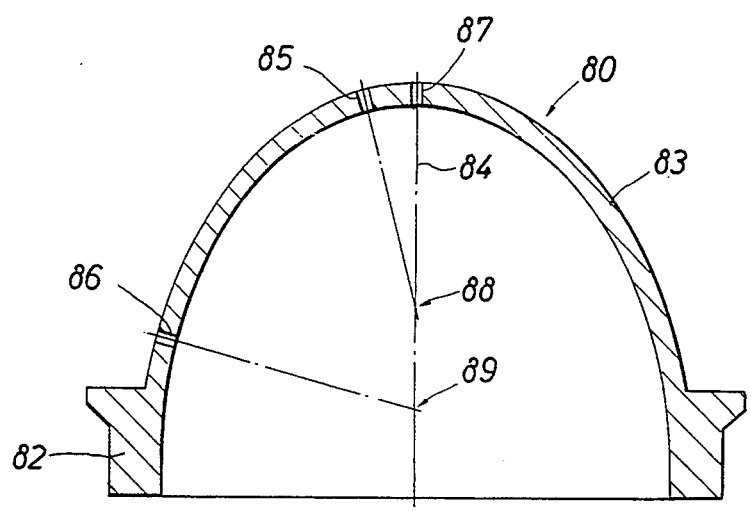
FIG. 5 is a schematic side elevation in cross section of a filter support according to the present invention, whose dome shape comprises a portion of an ellipsoid.

Another special case of the shape of a dome according to the present invention is provided in FIG. 5. There, a filter support, shown generally at 80, includes a filter support generally cylindrical tubular pedestal 82 and a dome shape rigid wall 83 in the form of a partial ellipsoid. The central axis 84 of the dome 83 is also the principal axis of the ellipsoid of which the dome forms a portion. In this case, the base of the dome as defined above has a radius which is smaller that the height of the dome along its central axis 84. Two holes 85 and 86 are indicated for rows of holes near the central axis 84 and relatively far from the central axis, respectively, with a hole 87 through the apex of the dome 83. The longitudinal axis of the apex hole 87 is the axis of the partial ellipsoid 83. The longitudinal axis of the hole 85 intersects the central axis 84 at a point indicated at 88, while the longitudinal axis of the hole 86 intersects the central axis at a point indicated at 89. Again, as in the case of the paraboloid 73 of FIG. 4, in general, the longitudinal axes of holes positioned in different rows of holes through the ellipsoid 83 will intersect the dome central axis 84 at different points. In the case of both the paraboloid dome 73 of FIG. 4 and the ellipsoid dome 83 of FIG. 5, the points of intersections of the longitudinal axes of the holes with the central axes are farther from the apex of the respective dome for holes lying in rows that are farther from the apex of the dome.

It will be appreciated that in each of the three cases illustrated in FIGS. 3-5, the flow of extruder material through the passage holes is such that, on the downstream side of the holes, the flow is directed generally toward and along the central axis of the filter support. In the case of the hemisphere of FIG. 3, the initial flow direction of extrusion material exiting the passageways is toward the hemisphere center 66. The initial flow direction for extrusion material exiting the passageways in the partial parabolid 74 of FIG. 4 is toward points along the central axis which are farther from the apex of the dome for holes farther from the apex as well; this is the same general flow pattern for the partial ellipsoid of FIG. 5.

Figure 6:
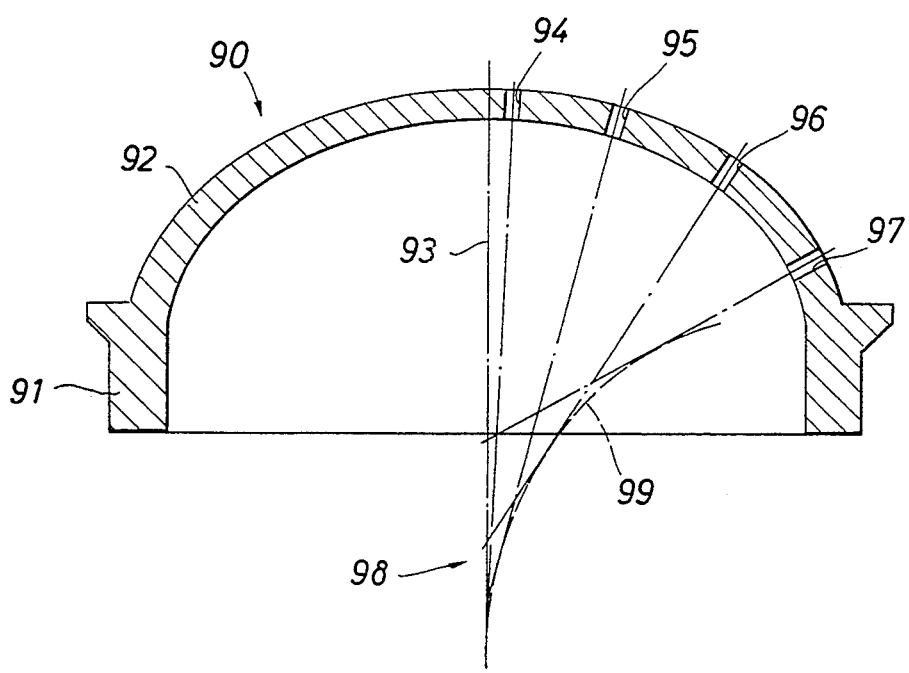
FIG. 6 is a view similar to FIG. 5, but with the partial ellipsoid shape of the filter support perpendicular to the orientation of the ellipsoid shape of the filter support of FIG. 5.

Another particular case of the shape of a dome portion of a filter support according to the present invention is provided in FIG. 6. A filter support, shown generally at 90, includes a generally cylindrical tubular pedestal 91 and a dome shape rigid wall 92 in the form of a portion of an ellipsoid, in this case with the principle axis of the ellipsoid perpendicular to the central, longitudinal axis 93 of the filter support. A comparison of the radius of the base of the partial ellipsoid 92 with the height of the dome, as defined above, shows that the height of the dome is smaller than the radius of its base. Thus, the filter support 90 of FIG. 6 may be utilized in an extrusion line wherein the tubular structure housing the filter system is relatively short compared to the transverse diameter of the tubular structure.

An array of holes may be provided as flow passages through the dome 92 as discussed above, with the greatest density of holes consistent with the selection of hole size and hole spacing to ensure sufficient structural strength of the dome. The holes are oriented perpendicular to the surfaces of the dome at the locations of the respective holes. Since the dome 92 is not a portion of a sphere, the longitudinal axes of the holes through the dome intersect the central axis 93 of the filter support 90 at different locations along the central axis, depending on the rows in which the holes are located. All of the holes in one row, concentric about the central axis 93, have longitudinal axes which intersect the central axis at the same point. Further, the curvature of the ellipsoid 92 is such that, for holes in rows located farther from the apex of the dome, the points of intersection of the longitudinal axes of the holes with the central axis are closer to the apex than is the case for longitudinal axes of holes in rows that are closer to the apex.

Four holes 94, 95, 96 and 97, positioned in rows of increasing radius, respectively, are illustrated in FIG. 6, with their respectively longitudinal axes intersecting the central axis 93 of the filter support 90 throughout a region indicated at 98. As the longitudinal axes of the holes through the dome 92 approach the filter support central axis 93, the hole longitudinal axes become tangent to a curve shown in dashed line 99. Even though the longitudinal axes of the dome holes tend to cross in the vicinity of the filter support central axis 93, nevertheless the holes are sufficiently distant from the area of intersection of the hole longitudinal axes with the filter support central axis that laminar flow of extrusion material through the dome holes is not destroyed by the movement of the extrusion material generally toward the central axis upon passage of the material through the dome.

Although several specific dome shapes are illustrated and discussed herein, deviations from the shapes may be employed for filter supports according to the present invention to accommodate the dimensions of the tubular structure housing the filter system in a particular extrusion line. The locations of the rows in any case of a dome filter support according to the present invention may be determined in terms of the spacing between adjacent rows of holes, as defined above, measured along the concave surface of the dome, for example.

Figure 7:
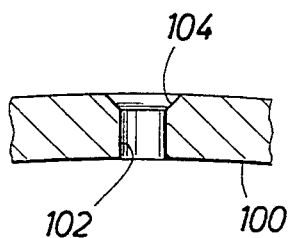
FIG. 7 is a fragmentary view in cross section of a portion of a filter support dome according to the present invention, featuring a structured flow passage.

Filter supports according to the present invention may also feature variations in the structure of the dome holes that provide particular advantages, for example. FIG. 7 illustrates a portion of a dome 100 having a hole 102 with a chamfer, or frustoconical bevel, 104 at the upstream end of the hole. Chamfering the hole as in FIG. 7 provides a greater initial flow passage cross-sectional area into the hole 102, and reduces the length of the narrower, cylindrical portion of the hole 102 to decrease the resistance to flow of the extrusion material through the hole. The chamfer 104 also permits a more gradual turn into the hole 102 of extrusion material approaching the hole by moving along close to the upstream surface of the dome 100.

Figure 8:
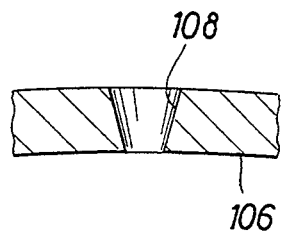
FIG. 8 is a view similar to FIG. 6, but showing a flow passage with different structure.

A segment of a dome 106 is illustrated in FIG. 8, including a hole 108 through the dome wherein the hole is frustoconical throughout its length with the base of the truncated cone at the upstream end of the hole. The wide-mouth hole 108 provides a greater initial flow-through cross-sectional area, and diminishes the resistance to the flow of extrusion material through the hole, as compared to a cylindrical hole.

Figure 9:
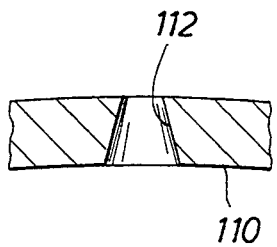
FIG. 9 is a view similar to FIGS. 7 and 8, but showing a flow passage with yet a different structure.

In FIG. 9 a portion of a dome 110 is shown broken by a frustoconical flow passage hole 112, in this case with the narrow end of the conical shape at the upstream opening of the hole. The tapered hole 112 provides an increased flow passage cross-sectional area inside the upstream opening of the hole, also reducing the resistance to flow of the extrusion material through the hole.

Figure 10:
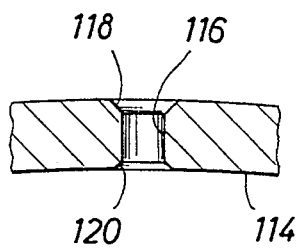
FIG. 10 is a view similar to FIGS. 7, 8 and 9, but showing a flow passage with another different structure.

In FIG. 10 a portion of a dome 114 features a flow passage hole 116 having a chamfered upstream entrance 118 and a chamfered downstream exit 120. The interior portion of the hole 116 between the two chamfered areas 118 and 120 is in the form of a circular cylinder. The entrance chamfer 118 provides the same benefits as the chamfer 104 of FIG. 7. The exit chamfer 120 also increases the cross-sectional flow area for the extrusion material exiting the hole 116. At the same time the exit chamfer 120 permits relatively smooth movement of the extrusion material around toward the concave surface of the dome 114. The combination of the two chamfers 118 and 120 reduces the length of the central, cylindrical portion of the hole 116 to thereby reduce the resistance to flow of the extrusion material through the hole.

In addition to the variations of flow passage holes through dome structures as illustrated in FIGS. 7–10, for example, the entrances and/or exits of flow passages may be chamfered or rounded to enhance laminar flow of extrusion material through the filter support in general.

A filter support according to the present invention may be constructed of any material that provides the strength to support and maintain a screen assembly, and is not damaged by corrosion or errosion in the extrusion line. High strength steel, plated to prevent rust, for example, or a non-ferrous metal alloy may be used. A ceramic may also be used to form a filter support according to the present invention.

It will be appreciated that the present invention provides a rigid wall with a structurally strong dome shape broken by an array of flow passages whose density is generally uniform. For given parameters including minimum limits for distances between adjacent holes in a row and adjacent rows of holes, the maximum number of holes may be provided in the dome of a filter support according to the present invention. The flow passages through the dome wall are oriented perpendicularly to the wall at the location of the respective flow passages. The resulting array of holes and their distribution and orientation minimize the amount of turning the extrusion material must undergo in negotiating through the resulting filter system, minimize the resistance to flow through the rigid wall of the filter support due to the length of the flow passages, promote laminar flow through and on both sides of the rigid wall of the filter support, and thereby minimize the pressure drop across the filter support and any attendant back pressure on the upstream side of the filter support.

The foregoing disclosure and description of the invention is illustrative and explanatory thereof, and various changes in the method steps as well as in the details of the illustrated apparatus may be made within the scope of the appended claims without departing from the spirit of the invention.

What is claimed is:

1. A filter support for use as part of a screen packing, which screen packing also includes a screen filter, in a system for extruding material, the screen packing being positioined within a tubular enclosure along which material to be extruded is made to flow, the filter support comprising a rigid wall comprising the shape of a dome having a central axis, the convex surface of the dome facing upstream of the flow of material to be extruded, and the rigid wall being broken by an array of holes forming flow passages for the material to be extruded through the wall, wherein the radius of the dome shape at its base is less than the height of the dome shape.

2. A filter support as defined in claim 1 wherein the holes are oriented relative to the wall so that the longitudinal axis of each hole is perpendicular to the plane tangent to the surface of the dome at the location of the hole.

3. A filter support as defined in claim 1 wherein in the array of holes comprises a plurality of generally circular rows of holes with each row centered on the central axis of the dome, wherein the holes in a row are generally uniformly spaced about the circumference of that row, and wherein the rows are generally uniformly spaced relative to each other.

4. A filter support as defined in claim 1 wherein the array of holes comprises a plurality of generally circular rows of holes concentric about the central axis of the dome, and wherein the number of holes in each row is a maximum for a selected minimum distance between the centers of adjacent holes in each row, and wherein the number of rows between the smallest row and the largest row is a maximum for a selected minimum distance between a line running through the centers of the holes of one row and a line running through the centers of the holes of a next adjacent row.

5. A filter support as defined in claim 1 wherein the dome shape comprises a portion of an ellipsoid whose principal axis lies along the central axis of the dome.

6. A filter support as defined in claim 1 wherein the array of holes comprises a hole along the central axis of the dome.

7. A filter support as defined in claim 1 wherein the wall comprises steel.

8. A filter support as defined in claim 1 wherein the wall comprises non-ferrous metal.

9. A filter support as defined in claim 1 wherein the wall comprises ceramic.

10. A filter support as defined in claim 1 wherein the array of holes includes holes each of which comprises a circular cylinder.

11. A filter support as defined in claim 1 wherein the array of holes includes holes each of which comprises at least one chamfered end.

12. A filter support as defined in claim 1 wherein the array of holes includes holes each of which comprises a frustoconical surface.

* * * * *